Jan. 27, 1931. G. H. LELAND ET AL 1,790,159
MOUNTING FOR ELECTRIC MOTORS AND THE LIKE
Filed Jan. 31, 1927    2 Sheets-Sheet 2
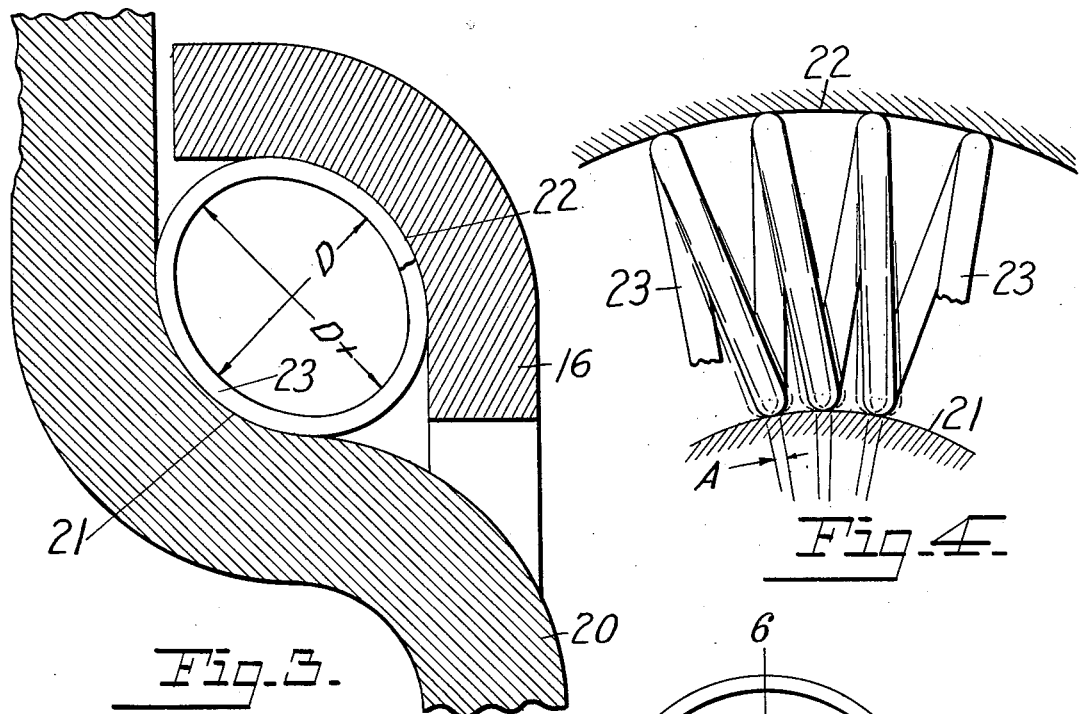
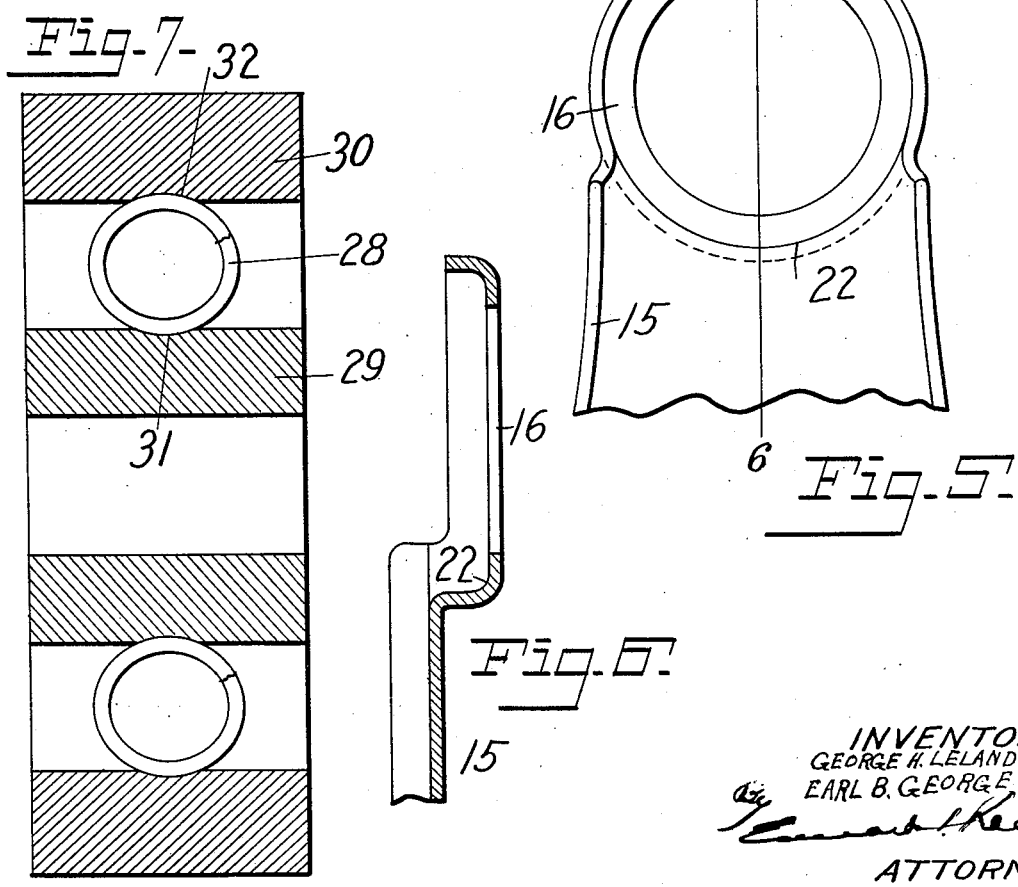
INVENTORS
GEORGE H. LELAND and
EARL B. GEORGE
ATTORNEY.

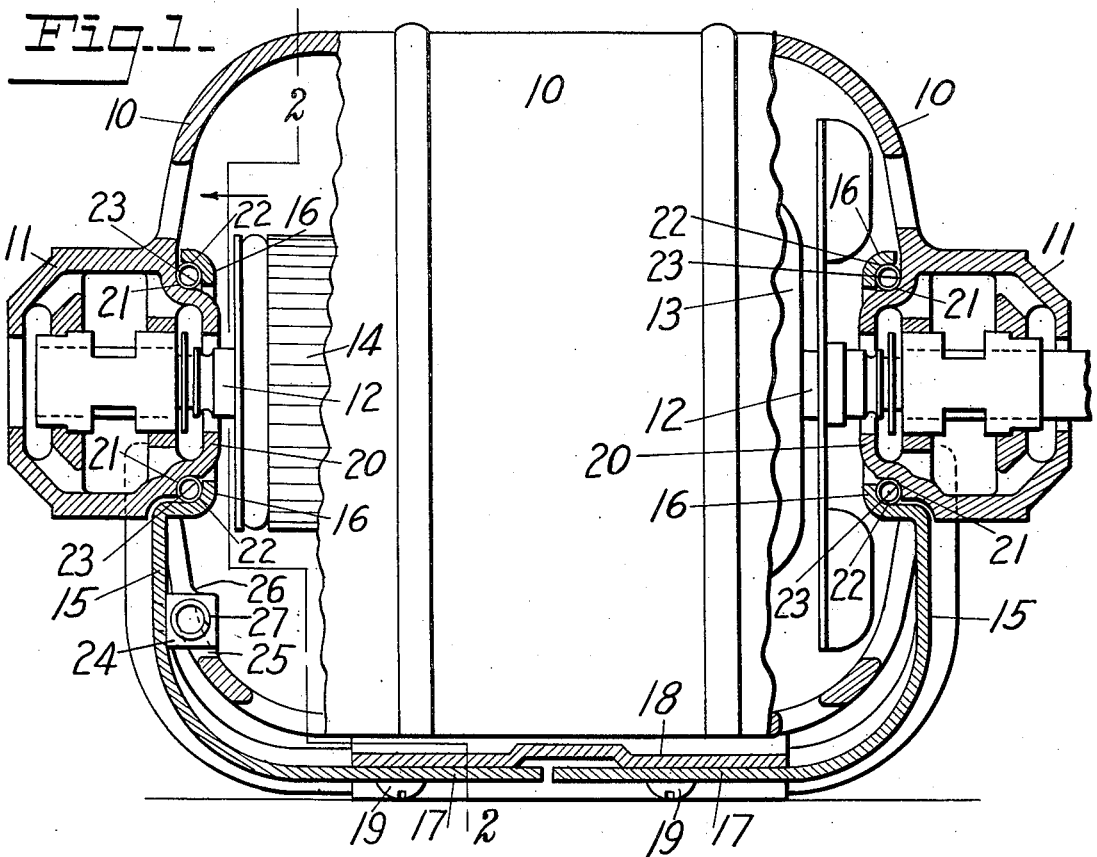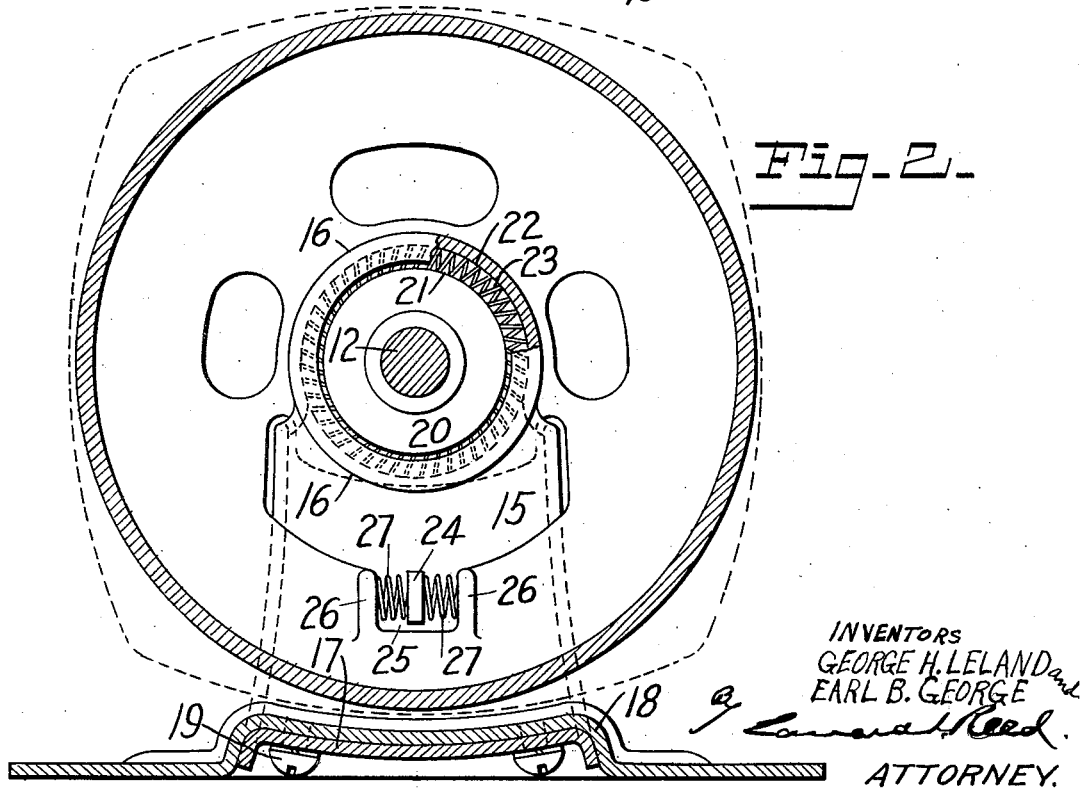

Patented Jan. 27, 1931

1,790,159

UNITED STATES PATENT OFFICE

GEORGE H. LELAND AND EARL B. GEORGE, OF DAYTON, OHIO, ASSIGNORS, BY DIRECT AND MESNE ASSIGNMENTS, OF THREE-FOURTHS TO THE LELAND ELECTRIC COMPANY, OF DAYTON, OHIO, A CORPORATION OF OHIO, AND ONE-FOURTH TO SAID GEORGE H. LELAND

MOUNTING FOR ELECTRIC MOTORS AND THE LIKE

Application filed January 31, 1927. Serial No. 164,895.

This invention relates to mountings for electric motors and the like.

Alternating current motors, particularly of the single phase induction type, develop a torsional vibration in response to the pulsating power of the alternating current and while these vibrations are of themselves scarcely audible they are frequently transmitted to the machine or to the supporting structure with which the motor is associated so as to build up in the machine or supporting structure vibrations which become highly audible. Motors of this type are extensively used in connection with household appliances such as electrically operated refrigerators, oil burners, water pumps and the like and when so used the noise is highly objectionable. In the application filed by George H. Leland on June 16, 1926, Serial No. 116,342, is shown a mounting which will prevent the transmission of these vibrations to the supporting structure and the present invention is in the nature of an improvement upon the mounting there shown.

One object of the invention is to provide an improved means for so mounting a motor, or other machine having inherent torsional vibration, as to prevent the transmission of such vibrations to the supporting structure.

A further object of the invention is to provide such a mounting which, while preventing the transmission of torsional vibrations, will restrain the movement of the supported structure under the steady application of torque thereto.

A further object of the invention is to provide such a mounting, which, while preventing the transmission of torsional and slight radial vibrations will carry heavy radial thrust loads with little or no deflection.

A further object of the invention is to provide such a mounting which will be simple in construction, easy to install and which will retain its essential characteristics indefinitely.

Other objects of the invention will appear as the apparatus is described in detail.

In the accompanying drawings Fig. 1 is a longitudinal section view of a motor equipped with the invention and showing the motor casing partly in elevation; Fig. 2 is a transverse sectional view taken on the line 2—2 of Fig. 1; Fig. 3 is a transverse sectional view of the mounting on an exaggerated scale; Fig. 4 is a side elevation of a portion of the mounting on an exaggerated scale; Fig. 5 is an elevation of the annular supporting member; Fig. 6 is a vertical sectional view of said supporting member; and Fig. 7 is a sectional view of a slightly different form of mounting.

In these drawings we have illustrated one embodiment of our invention and have shown the same as applied to an electric motor. It will be understood that this particular embodiment has been chosen for the purposes of illustration and that the mounting may take various forms and may be applied to machines of other kinds without departing from the spirit of the invention.

As here shown, the motor to which the invention is applied comprises a casing or main frame 10 which supports the field coils, not shown, and has at its ends bearings 11 in which are journaled the ends of the shaft 12 which carries the armature 13 and commutator 14. Ordinarily in a motor of this kind the legs or other supporting structure are rigidly secured to the casing or main frame. As a result the vibrations are transmitted through the supporting structure to the machine or other part on which the motor is mounted, and the vibrations are so amplified as to render the operation of the motor noisy. In applying the present invention to such a motor the supporting structure is made separate from the main frame and a yieldable device is interposed between the supporting structure and the main frame to absorb the vibrations. In the present construction the supporting structure comprises standards 15, one at each end of the motor, and each standard has at its upper end an annular portion 16. The standards may be supported in any suitable manner but, as here shown, their lower portions are bent inwardly, as shown at 17, and are arranged beneath an elevated portion of base 18 to which they are rigidly secured, as by means of screws 19. The annular supporting member 16 is arranged about and forms a cradle support for an inwardly extending portion 20 of the main frame or motor casing, which portion constitutes a supporting part concentric with the motor shaft. The supporting member 16 and supporting part 20 of the frame have opposed surfaces 21 and 22 which, in the present instance, are curved and are arranged in a manner quite similar to the ball races of an anti-friction bearing. The annular supporting member is of a diameter somewhat greater than the diameter of the supporting part and interposed between the bearing surfaces 21 and 22 is a resilient device, which is preferably in the form of an annular helical spring 23 which when interposed between said surfaces will maintain the supporting part 20 of the frame out of contact with the annular member 16. In the present device the cross sectional diameter of the helical spring, that is, the diameter of its individual coils, is slightly greater than the distance between the supporting surfaces 21 and 22, of the annular member 16 and supporting part 20, and when the spring is in position between these surfaces it will be compressed or distorted slightly, so as to give its section an oblong shape, as shown in an exaggerated form in Fig. 3. This results in the individual coils of the spring having a very firm frictional contact with the supporting surfaces, which will serve to prevent any sliding movement between coils of the spring and the surfaces with which they are in contact. The spring, however, has a high degree of circumferential resiliency which will permit of the circumferential movement of the supporting part with relation to the annular supporting member without shifting the points of contact of the coils of the spring with either supporting surface, and because of this resiliency the spring will absorb the torsional vibrations of the main frame or casing and prevent the same from being transmitted to the standards 15. This arrangement of the spring will also cause it to absorb slight radial vibrations in the main frame but the coils have little or no transverse resiliency and inasmuch as a large number of coils are interposed between the supporting part and the annular supporting member on all sides of the axis the spring will strongly resist any lateral deflection of the supporting race due to heavy radial loads thereon, such as the thrust of a belt pulley on the motor shaft. The frictional contact between the spring and the opposed surfaces of the supporting part and annular supporting member is sufficient to prevent the slippage of the supporting race with relation to the coils of the spring or of the spring with relation to the supporting member under the normal torque to which the motor casing is subjected. In order to prevent this slippage under abnormal torques, as during the starting of the motor, we have interposed between the motor casing and the supporting structure a yieldable device which will not transmit the torsional vibrations from the casing to the supporting structure but will positively limit the continued movement of the motor casing with relation to the supporting structure. As here shown, this device comprises a stud 24 rigidly secured to one of the standards 15 and extending through an opening 25 in the casing 10. At each end of this opening a lug 26 is arranged parallel with the lug 24 and between the lug 24 and the respective lugs 26 are arranged coiled springs 27, the arrangement being such that these springs will yield to permit of minor movements of the casing with relation to the standards but any considerable movement of the casing will compress the coils of one of the springs 27, one against the other, and thus provide a positive stop to prevent further movement of the casing.

In Fig. 7 we have shown a modified arrangement of the mounting in which the annular helical spring 28 is interposed between a substantially cylindrical supporting part 29 and a corresponding supporting member 30, the opposed surfaces of the supporting part and supporting member being recessed as shown at 31 and 32, respectively, to provide seats for the spring.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In a device for preventing the transmission of vibrations from the frame of a machine to the structure which supports the same, cooperating parts carried respectively by said frame and said supporting structure and having opposed elongated surfaces, and a helical spring extending parallel with and confined between said opposed elongated surfaces and serving to support said frame on said structure.

2. In a mounting for a machine of the character described, a frame, a supporting structure for said frame, said frame and said supporting structure having annular surfaces opposed one to the other, and an annular helical spring interposed between said surfaces to support the frame out of contact with the supporting structure.

3. In a mounting for a machine of the character described, a frame having a part forming a support therefor, a supporting member extending about said part of said frame, said part of said frame and said supporting member having opposed surfaces, and an endless, helical spring interposed between said opposed surfaces, the normal cross sectional diameter of said spring being slightly greater at all points than the distance between the adjacent portions of said surfaces, whereby said spring will be slightly distorted throughout its length when confined between said surfaces.

4. In a mounting for a machine of the character described, a frame having a part forming a support therefor, a supporting member extending about said part of said frame, and a resilient element interposed between said part of said frame and said supporting member and comprising a plurality of connected parts, the adjacent parts of said resilient element having contact with said part of said frame at separated points only and having contact with said supporting member at separated points only, the contacting surfaces of said parts of said resilient member being held substantially against movement with relation respectively to said part of said frame and said supporting member.

In testimony whereof, we affix our signatures hereto.

GEORGE H. LELAND.
EARL B. GEORGE.